United States Patent
Mertens et al.

(10) Patent No.: US 10,826,906 B2
(45) Date of Patent: Nov. 3, 2020

(54) SYSTEM AND COMPUTER-IMPLEMENTED METHOD FOR CONTROLLING ACCESS TO COMMUNICATIVE MOTOR

(71) Applicant: Nidec Motor Corporation, St. Louis, MO (US)

(72) Inventors: Donald R. Mertens, Columbia, IL (US); Prakash B. Shahi, St. Louis, MO (US); Bret S. Clark, Oakville, MO (US); Hector M. Hernandez, Godfrey, IL (US); Daniel Bugger, Edwardsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 203 days.

(21) Appl. No.: 15/976,762

(22) Filed: May 10, 2018

(65) Prior Publication Data
US 2019/0349378 A1    Nov. 14, 2019

(51) Int. Cl.
*H04L 29/06*    (2006.01)
*H04W 12/06*    (2009.01)
(Continued)

(52) U.S. Cl.
CPC ............ *H04L 63/101* (2013.01); *H04L 63/06* (2013.01); *H04L 63/0846* (2013.01);
(Continued)

(58) Field of Classification Search
CPC ... H04L 63/101; H04L 63/06; H04L 63/0846; G05B 19/02; H04W 12/06; H04W 84/18
(Continued)

(56) References Cited

U.S. PATENT DOCUMENTS

| 5,749,253 A | * | 5/1998 | Glick | ................. G07C 9/00571 |
| | | | | 70/278.2 |
| 6,731,731 B1 | * | 5/2004 | Ueshima | ................. G06F 21/31 |
| | | | | 379/196 |

(Continued)

FOREIGN PATENT DOCUMENTS

WO    2017003136    1/2017

OTHER PUBLICATIONS

PCT International Search Report and Written Opinion from PCT Application No. PCT/US2019/017267 entitled System and Computer-Implemented Method for Controlling Access to Communicative Motor (dated May 31, 2019).

*Primary Examiner* — Shahriar Zarrineh
(74) *Attorney, Agent, or Firm* — Hovey Williams LLP

(57) ABSTRACT

A system and computer-implemented method for controlling wireless access to the operations of communicative electric motors. An electronic processing element receives an authentication request from a remote access device via a wireless transceiver, approves the authentication request, including determining an associated access level from among a hierarchy of access levels, and grants access to a motor controller to perform actions allowed by the associated access level. Approving the request may be based on receiving a valid password, which may be calculated on the remote access device by a computer program using an electronic key, or by receiving information from an authentication hardware component associated with the device. The various access levels may allow for shutting off, read-only monitoring (of, e.g., temperature, vibration), controlling (e.g., speed), and programming (e.g., tap settings) operation of the motor, and controlling the authentication process (e.g., adding and removing users and assigning and changing access levels).

9 Claims, 3 Drawing Sheets

(51) Int. Cl.
*G05B 19/02* (2006.01)
*H04W 84/18* (2009.01)

(52) U.S. Cl.
CPC ............ *G05B 19/02* (2013.01); *H04W 12/06* (2013.01); *H04W 84/18* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 6,984,950 | B2* | 1/2006 | Jonsson | H05K 7/1432 318/440 |
| 9,805,528 | B1 | 10/2017 | Toepke et al. | |
| 10,006,462 | B2 | 6/2018 | Becerra et al. | |
| 2002/0178385 | A1* | 11/2002 | Dent | H04L 63/108 726/27 |
| 2005/0212656 | A1* | 9/2005 | Denison | B62H 5/20 340/5.73 |
| 2006/0026672 | A1* | 2/2006 | Braun | G05B 19/042 726/9 |
| 2006/0179322 | A1* | 8/2006 | Bennett | G06F 21/41 713/182 |
| 2006/0208673 | A1* | 9/2006 | Kling | H02P 1/56 318/66 |
| 2007/0028117 | A1 | 2/2007 | Wong | |
| 2008/0022363 | A1* | 1/2008 | Le | G06F 21/78 726/2 |
| 2009/0112872 | A1 | 4/2009 | Doi | |
| 2011/0010761 | A1* | 1/2011 | Doyle | G06F 21/6218 726/5 |
| 2011/0241826 | A1* | 10/2011 | Blackwell, Jr. | G07C 9/00817 340/5.22 |
| 2013/0169411 | A1* | 7/2013 | Chan | G05B 1/00 340/5.54 |
| 2014/0139166 | A1* | 5/2014 | Durfee | G06F 8/60 318/494 |
| 2014/0172192 | A1 | 6/2014 | Kato | |
| 2014/0209400 | A1* | 7/2014 | Yao | B62M 6/45 180/167 |
| 2015/0107316 | A1* | 4/2015 | Kirkjan | G07C 9/00182 70/275 |
| 2015/0220715 | A1* | 8/2015 | Kim | G06F 21/32 726/18 |
| 2015/0253787 | A1* | 9/2015 | Mullin | G06Q 10/20 318/16 |
| 2015/0339334 | A1* | 11/2015 | Hanke | H04W 4/023 707/736 |
| 2016/0077531 | A1* | 3/2016 | Kucera | F16K 37/0091 137/2 |
| 2016/0173496 | A1* | 6/2016 | Saka | G06F 21/44 726/4 |
| 2016/0180618 | A1* | 6/2016 | Ho | G07C 9/00563 340/5.52 |
| 2016/0196706 | A1* | 7/2016 | Tehranchi | H04W 4/80 340/5.61 |
| 2016/0344747 | A1* | 11/2016 | Link, II | G06F 21/35 |
| 2017/0348854 | A1* | 12/2017 | Oleynik | A47J 47/02 |
| 2018/0309741 | A1* | 10/2018 | Neafsey | G06F 21/45 |
| 2019/0082240 | A1* | 3/2019 | Li | H04Q 9/00 |
| 2019/0201051 | A1* | 7/2019 | Narayanan | A61B 17/3207 |

* cited by examiner

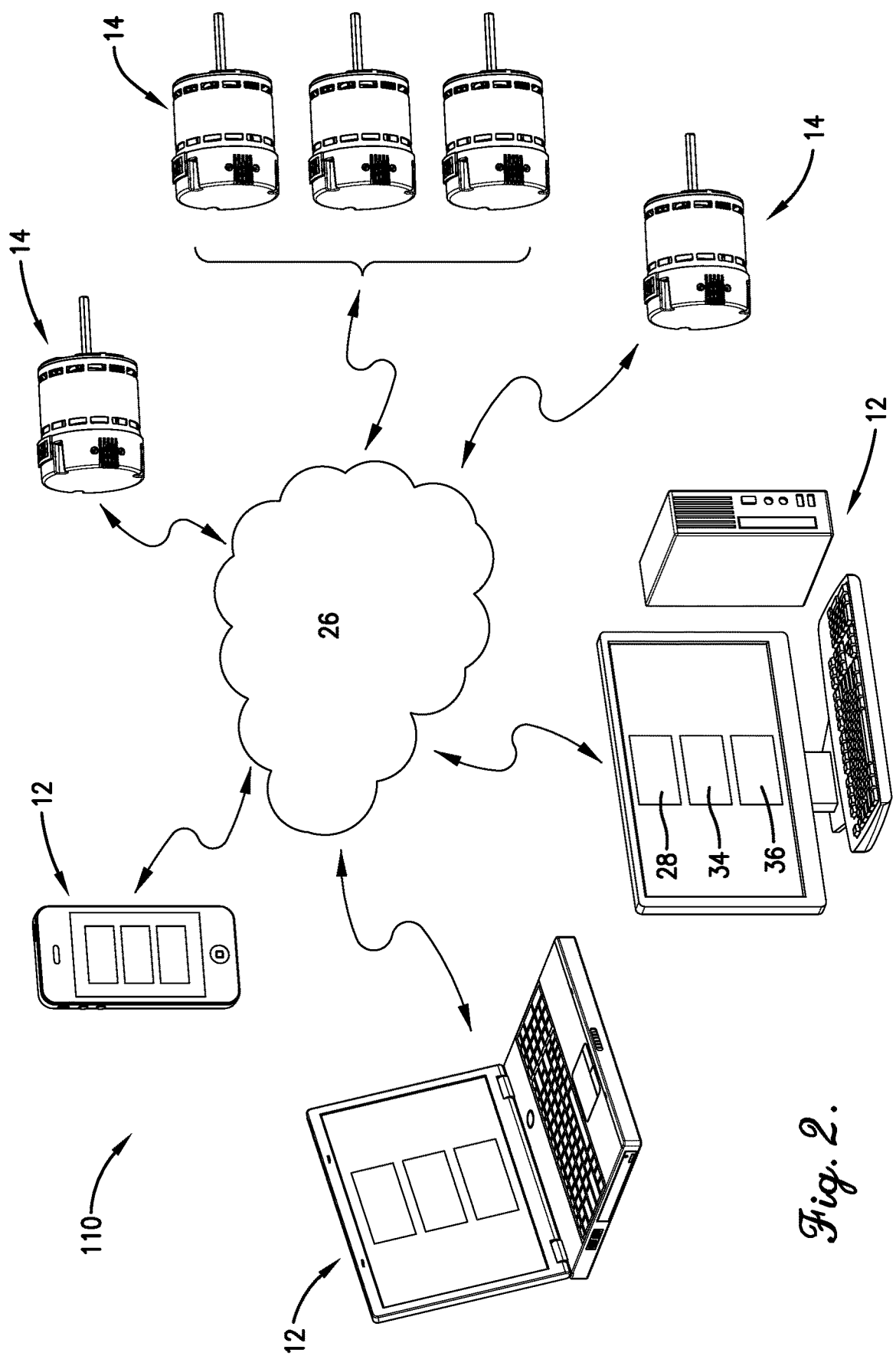

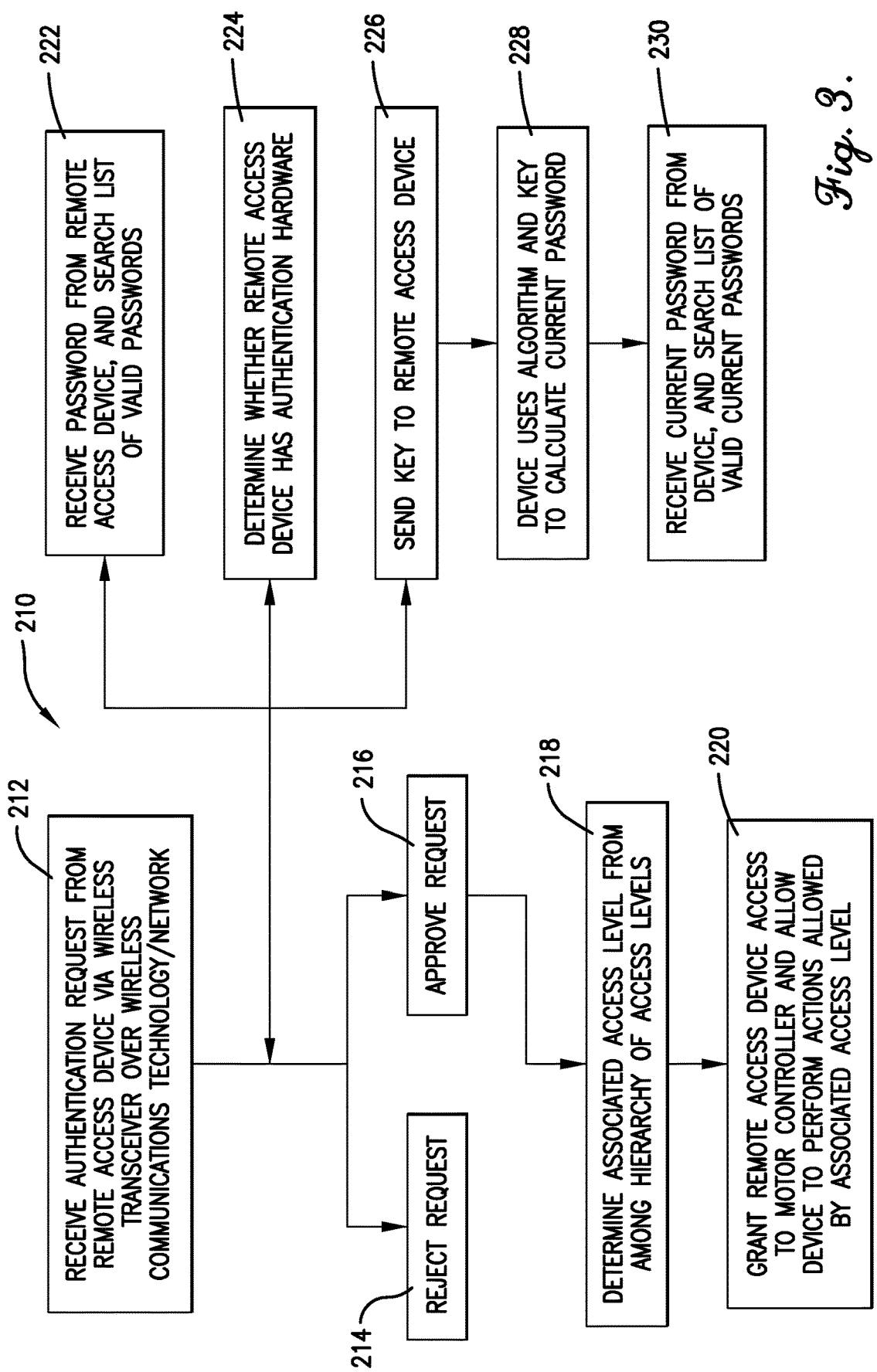

SYSTEM AND COMPUTER-IMPLEMENTED METHOD FOR CONTROLLING ACCESS TO COMMUNICATIVE MOTOR

FIELD

The present invention relates to systems and methods for controlling access to the operations of electric motors, and more particularly, embodiments provide a system and computer-implemented method for controlling wireless access to the operations of communicative electric motors, including access for the purposes of monitoring, controlling, and programming operation of these electric motors.

BACKGROUND

As variable speed electric motors become increasingly common, the ability to communicate with them in a consistent and reliable way becomes more important. Such communication can allow for accessing real time operations data, issuing run commands, and reprogramming operations. However, it is desirable to control access to these different functions, and the need for access may vary with different applications and change over time. Some users may only need to view basic data, while others may need the ability to completely reprogram motors to accommodate changing circumstances. It is also desirable to be able to communicate with different motors/platforms using the same protocol.

Existing solutions are generally focused on controlling physical access or requiring special hardware. Once an individual has the required hardware, they are able to communicate with the motors without end or limitation. Further, these are "all or nothing" solutions in that the ability to access the motors entails the ability to access all of the operations of the motors. However, motors are increasingly using wireless communication technologies which allow anyone to connect to them at any time, without even the obstacle of requiring that they obtain special hardware. This creates a situation in which unauthorized individuals may access and change motor operations for undesirable purposes.

This background discussion is intended to provide information related to the present invention which is not necessarily prior art.

SUMMARY

Embodiments address the above-described and other problems and limitations of the prior art by providing a system and computer-implemented method for controlling wireless access to the operations of communicative electric motors, including access for the purposes of monitoring, controlling, and programming operation of these electric motors. Embodiments advantageously prevent unauthorized access to communicative electric motors by providing a secure, multi-level, standardized protocol for flexibly controlling access to their various operations.

In an embodiment of the present invention, a system is provided for controlling access to an operation of an electric motor. The system may broadly comprise a motor controller, a wireless transceiver, and an electronic processing element. The motor controller may be configured to control the operation of the electric motor. The wireless transceiver may be configured to allow for bidirectional communication between the motor controller and a remote access device. The electronic processing element may be configured to execute an authentication process including receiving an authentication request from the remote access device via the wireless transceiver, approving the authentication request, including determining an associated access level from among a hierarchy of access levels, and granting the remote access device access to the motor controller and allowing the remote access device to perform one or more actions allowed by the associated access level.

Various implementations of this embodiment may include any one or more of the following features. The remote access device may be a smartphone. The remote access device and the wireless transceiver may communicate via Bluetooth and/or via the Internet. The system may be configured to control access to the operations of a plurality of electric motors simultaneously.

The system may further include an electronic memory element containing a list of valid passwords and associated access levels, wherein the authentication request includes a particular password, and the electronic processing element is configured to search the list of valid passwords for the particular password and approve the authentication request if the particular password is in the list of valid passwords. The system may further include an authentication hardware component associated with the remote access device and configured to send authentication information to the electronic processing element, and wherein the electronic processing element is configured to approve the authentication request if the authentication information is received. The system may further include an electronic memory element containing a list of valid current passwords and associated access levels, and further including a computer program executed by the remote access device to calculate a current password using an electronic key, wherein the electronic processing element is configured to provide the electronic key to the computer program in response to the authentication request, the computer program is configured to calculate and send the current password to the electronic processing element, the electronic processing element is configured to search the list of valid current passwords for the current password and approve the authentication request if the current password is in the list of valid current passwords. The electronic key and the list of valid current passwords may be periodically changed.

The hierarchy of access levels may include a first level which allows for read-only access to a set of basic information about the operation of the electric motor, a second level which additionally allows for controlling the operation of the electric motor, and a third level which additionally allows for programming the operation of the electric motor. The hierarchy of access levels may further include an emergency level which allows only for shutting off the operation of the electric motor, and/or an administrative level which additionally allows controlling the authentication process.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 2 is a diagram of a second embodiment of a system for controlling access to the operation of an electric motor; and FIG. 3 is a flowchart of an embodiment of a computer-implemented method for controlling access to the operation of an electric motor.

Figure 1:
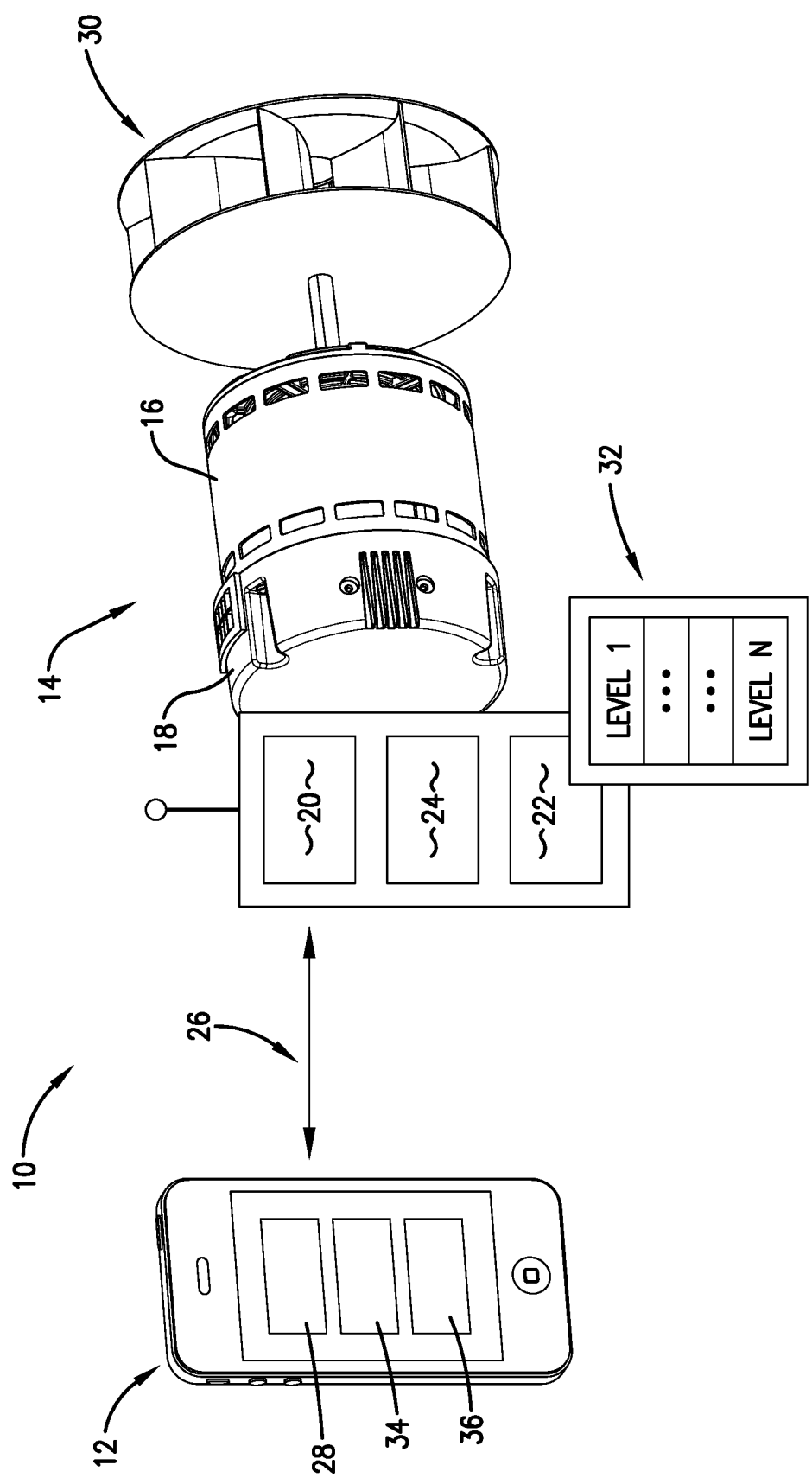
FIG. 1 is a diagram of a first embodiment of a system for controlling access to the operation of an electric motor.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a system and computer-implemented method for controlling wireless access to the operations of communicative electric motors, including access for the purposes of monitoring, controlling, and programming operation of these electric motors. Embodiments advantageously avoid unauthorized access to communicative electric motors by providing a secure, multi-level, standardized protocol for flexibly controlling access to their various operations, and because the protocol is standardized, it can be applied to different motors and platforms without requiring major changes.

In one implementation, there may be at least three increasingly capable hierarchical levels of access. A lowest or minimum level of access (which may be referred to as "Level 1") may allow for monitoring the operation of the electric motor, i.e., may allow for read-only access to a set of basic information about the operation. The nature of the basic information that can be accessed may vary with the electric motor, the application, and the desire or need for particular information, but may generally include such information as speed, torque, temperature, and/or vibration. The basic information may include information which can be provided by a motor controller and/or information which can be provided by one or more sensors (e.g., vibration sensors, optical sensors, Hall-effect sensors, optical sensors) associated with the motor.

An intermediate level of access ("Level 2") may additionally allow for controlling the operation of the electric motor. The nature of the operations that can be controlled may vary with the electric motor, the application, and the desire or need for particular control, but may generally include controlling such functions as starting, stopping, speed, and/or torque.

A highest or maximum level of access ("Level 3") may additionally allow for programming the operation of the electric motor. The nature of the operations that can be programmed may vary with the type of electric motor, the application, and the desire or need for particular programming, but may generally include programming such functions as speeds or speed ranges and/or tap settings.

Other implementations may include additional or alternative levels of access as desired or needed. For example, an emergency level of access ("Level 0") may be limited to shutting off the operation of the electric motor. This level of access may be available to, e.g., maintenance and/or security personnel, emergency responders such as firefighters and/or police, and/or others who may need this ability to perform their jobs. For another example, an administrative level ("Level 5") may additionally allow for controlling the authentication process itself, including adding and removing users and changing the access levels of users. In one implementation, exercising such administrative authority may require a direct hardwired connection to the electric motor.

In one implementation, controlling access may be based on transmitting a valid particular password to the electric motor, wherein the valid particular password is associated with a particular level of access. In another implementation, controlling access may be based on engagement and information exchange between an authentication hardware component, such as a "crypto chip," and the electric motor. In another implementation, controlling access may be based on calculating or otherwise determining a valid current password, and then transmitting the valid current password to the electric motor.

Referring to FIG. 1, a first embodiment of a system 10 is shown for controlling access to the operation of an electric motor. Broadly, the system 10 may comprise a remote access device 12 and an electric motor assembly 14 including the electric motor 16, a motor controller 18, a wireless transceiver 20, an electronic memory element 22, and an electronic processing element 24. In this embodiment, the remote access device 12 may be used to access the operation of one specific electric motor at a time. This embodiment may be particularly useful for residential or otherwise relatively smaller-scale applications involving the installation, monitoring, and/or servicing of individual motors.

Referring to FIG. 2, a second embodiment of the system 110 is shown for controlling access to the operation of one or more of the electric motors. Broadly, this system 110 may comprise the same components as the system 10 of the first embodiment except as noted. In this embodiment, the remote access device 12 may be used to access the operations of a plurality of electric motors simultaneously. This embodiment may be particularly useful for commercial, industrial, or otherwise relatively larger-scale applications involving the installation, monitoring, and/or servicing of multiple motors. In one implementation, a user may have the same level of access for all motors, while in another implementation, the user may have different levels of access for different motors.

The remote access device 12 may be substantially any suitable and otherwise conventional device configured to engage in wireless communication with the electric motor assembly 14 via the wireless transceiver 20 over a wireless communication technology or network 26. In one implementation, the remote access device 12 may be a smartphone or similar mobile communications device configured to communicate via, e.g., Bluetooth (as shown in FIG. 1) or WiFi (as shown in FIG. 2), while in another implementation, the remote access device 12 may be a laptop, tablet, desktop and/or other mobile or fixed computer similarly configured. The remote access device 12 may execute a software application or other computer program 28 configured to facilitate interacting with the electric motor 14.

The electric motor 14 may be substantially any suitable and otherwise conventional electric motor. In one implementation, the electric motor may be an alternating current three-phase motor such as is commonly used in many appliances, machines, and other residential and commercial applications, and may drive a corresponding load 30. The motor controller 18 may be substantially any suitable and otherwise conventional motor controller configured to generally control operation of the electric motor 14. In one implementation, the electric motor and the motor controller may be located in a common housing, while in another implementation, the electric motor and the motor controller may be located in separate housings and may be in communication with each other via wired or wireless communications technologies.

The wireless transceiver 20 may be substantially any suitable and otherwise conventional transceiver configured to allow for bidirectional wireless communication between the electric motor assembly 14 or some component thereof (e.g., the motor controller 18) and the remote access device 12. The electronic memory element 22 may be substantially any suitable and otherwise conventional device configured to store data. In particular, the memory element 22 may store data relevant to an authentication process which is described in detail below. The electronic processing element 24 may be substantially any suitable and otherwise conventional processor configured to execute a computer program implementing the authentication process. In one implementation, the processing element may be part of the motor controller, while in another implementation, the processing element may be separate from but in communication with the motor controller via wired or wireless technologies.

Referring also to FIG. 3, the authentication process may include the following. The processing element 24 may receive an authentication request from the remote access device 12 via the wireless transceiver 20 over the wireless communications technology/network 26, as shown in 212. The processing element 24 may reject the authentication request, as shown in 214, or the processing element 24 may approve the authentication request, as shown in 216, determine an associated access level from among a hierarchy of access levels, as shown in 218, and grant the remote access device 12 access to the motor controller 18 and allow the remote access device 12 to perform one or more actions allowed by the associated access level, as shown in 220.

In one implementation of the authentication process, the authentication request may include a particular password, and the memory element 22 may include a look-up table 32 of valid passwords and associated access levels. The processing element 24 may search the look-up table 32 for the particular password, and either reject the authentication request if the particular password is not found among the valid passwords or approve the authentication request if the particular password is found.

Additionally or alternatively, the remote access device 12 may include an authentication hardware component 34, such as a "crypto chip," configured to engage in an exchange of authentication information with the processing element 24. The processing element 24 may reject the authentication request if the authentication hardware component 34 is not present or does not engage or does not properly engage such that the processing element 24 does not receive the expected authentication information, and approve the authentication request if the authentication hardware 32 is present and does properly engage.

Additionally or alternatively, the remote access device 12 may include a computer program 36 for calculating or otherwise determining a password using an electronic key provided by the processing element 24. In more detail, the authentication request may include a request for the electronic key, and the processing element 24 may provide the electronic key in response to the request. Once in receipt of the electronic key, the remote access device 12 may use the computer program 36 to calculate or otherwise determine the password, and then transmit the password to the processing element 24. The processing element 24 may reject the authentication request if the password is incorrect, and approve the authentication request if the password is correct. The electronic key may change periodically, and therefore the password may change periodically, so the remote access device 12 may need to re-calculate or otherwise re-determine the password for subsequent access requests.

The systems 10,110 may include more, fewer, or alternative components and/or perform more, fewer, or alternative actions, including those discussed elsewhere herein, and particularly those discussed in the following section describing the method.

Referring again to FIG. 3, an embodiment of a computer-implemented method 210 is shown for controlling access to the operation of an electric motor. The method 210 may be a corollary to the functionalities of the above-described systems 10,110, and may be similarly implemented using the various components of the systems 10,110. The computer-implemented method may broadly comprise the following.

The processing element 24 may receive an authentication request from the remote access device 12 via the wireless transceiver 20 over the wireless communications technology/network 26, as shown in 212. The processing element 24 may reject the authentication request, as shown in 214, or the processing element 24 may approve the authentication request, as shown in 216, determine an associated access level from among a hierarchy of access levels, as shown in 218, and grant the remote access device 12 access to the motor controller 18 and allow the remote access device 12 to perform one or more actions allowed by the associated access level, as shown in 220.

The processing element 24 may execute an authentication process to determine whether to reject or approve the authentication request as follows. In one implementation, the authentication request may include a particular password, the memory element 22 may include a look-up table 32 of valid passwords and associated access levels. The processing element 24 may search the look-up table 32 for the particular password, as shown in in 222, and either reject the authentication request if the particular password is not found among the valid passwords, as shown in 214, or approve the authentication request if the particular password is found, as shown in 216.

Additionally or alternatively, the remote access device 12 may include authentication hardware 34, such as a "crypto chip," configured to engage in an exchange of authentication information with the processing element 24. The processing element 24 may determine whether the remote access device 12 has the authentication hardware 34, as shown in 224, and reject the authentication request if the authentication hardware 34 is not present or does not engage or does not properly engage, as shown in 214, and approve the authentication request if the authentication hardware 32 is present and does properly engage, as shown in 216.

Additionally or alternatively, the remote access device 12 may include a computer program 36 for calculating or otherwise determining a current password using an electronic key provided by the processing element 24. In more detail, the authentication request may include a request for the electronic key, and the processing element 24 may provide the electronic key in response to the request, as shown in 226. Once in receipt of the electronic key, the remote access device 12 may use the computer program 36 to calculate or otherwise determine the current password and then transmit the current password to the processing element 24, as shown in 228. The processing element 24 may search the look-up table 32 for the current password, as shown in in 222, and either reject the authentication request if the current password is not found among the valid current passwords, as shown in 214, or approve the authentication request if the current password is found, as shown in 216. The key may change periodically, and therefore the current password may change periodically, so the remote access device 12 may need to re-calculate or otherwise re-determine the current password for subsequent access requests.

The computer-implemented method 210 may include more, fewer, or alternative actions, including those discussed elsewhere herein.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for controlling access to an operation of an electric motor, the system comprising:
   a motor controller configured to control the operation of the electric motor;
   a wireless transceiver configured to allow for bidirectional communication between the motor controller and a smartphone;
   an electronic processing element configured to execute an authentication process including—
      receiving an authentication request from the smartphone via the wireless transceiver, wherein the authentication request includes a particular password,
      searching a list of valid passwords and associated access levels for the particular password,
      approving the authentication request if the particular password is in the list of valid passwords, including determining a particular associated access level from among a hierarchy of access levels, and
      granting the smartphone access to the motor controller and allowing the smartphone to perform one or more actions allowed by the particular associated access level; and
   a computer program executed by the smartphone to calculate a current password using an electronic key, wherein the electronic processing element is configured to provide the electronic key to the computer program in response to the authentication request, and the computer program is configured to calculate and send the current password to the electronic processing element, wherein the electronic key and the list of valid current passwords are periodically changed.

2. The system of claim 1, wherein the smartphone and the wireless transceiver communicate via Bluetooth.

3. The system of claim 1, wherein the smartphone and the wireless transceiver communicate via the Internet.

4. The system of claim 1, wherein the hierarchy of access levels include—
   a first level which allows for read-only access to a set of basic information about the operation of the electric motor;
   a second level which additionally allows for controlling the operation of the electric motor; and
   a third level which additionally allows for programming the operation of the electric motor.

5. The system of claim 4, further including an emergency level which allows only for shutting off the operation of the electric motor.

6. The system of claim 4, further including an administrative level which additionally allows controlling the authentication process.

7. The system of claim 1, wherein the system is configured to control access to the operations of a plurality of electric motors simultaneously.

8. A system for controlling access to an operation of an electric motor, the system comprising:
   the electric motor;
   a motor controller configured to control the operation of the electric motor;
   a wireless transceiver configured to allow for bidirectional communication between the motor controller and a smartphone;
   an electronic processing element configured to execute an authentication process including—
      receiving an authentication request from the smartphone via the wireless transceiver, wherein the authentication request includes a particular password,
      searching a list of valid passwords and associated access levels for the particular password,
      approving the authentication request if the particular password is in the list of valid passwords, including determining a particular associated access level from among a hierarchy of access levels, wherein the hierarchy of access levels include—
         a first level which allows for read-only access to a set of basic information about the operation of the electric motor,
         a second level which additionally allows for controlling the operation of the electric motor, and
         a third level which additionally allows for programming the operation of the electric motor, and
      granting the smartphone access to the motor controller and allowing the smartphone to perform one or more actions allowed by the particular associated access level; and
   a computer program executed by the smartphone to calculate a current password using an electronic key, wherein the electronic processing element is configured to provide the electronic key to the computer program in response to the authentication request, and the computer program is configured to calculate and send the current password to the electronic processing element, wherein the electronic key and the list of valid current passwords are periodically changed.

9. A system for controlling access to a plurality of operations of a plurality of electric motors simultaneously, the system comprising:
   the plurality of electric motors;

a plurality of motor controllers, with each motor controller configured to control the operation of a respective one of the electric motors;

a plurality of wireless transceivers, with each wireless transceiver configured to allow for bidirectional communication over the Internet between a respective one of the motor controllers and a smartphone;

a plurality of electronic processing elements, with each electronic processing element configured to execute an authentication process including— receiving an authentication request from the smartphone via a respective one of the wireless transceivers, wherein the authentication request includes a particular password, searching a list of valid passwords and associated access levels for the particular password, approving the authentication request if the particular password is in the list of valid passwords, including determining a particular associated access level from among a hierarchy of access levels, wherein the hierarchy of access levels include— a first level which allows for read-only access to a set of basic information about the operation of the respective one of the electric motors, a second level which additionally allows for controlling the operation of the respective one of the electric motors, and a third level which additionally allows for programming the operation of the respective one of the electric motors, and granting the smartphone access to the respective one of the motor controllers and allowing the smartphone to perform one or more actions allowed by the particular associated access level; and a computer program executed by the smartphone to calculate a current password using an electronic key, wherein each electronic processing element is configured to provide the electronic key to the computer program in response to the authentication request, and the computer program is configured to calculate and send the current password to the electronic processing element, wherein the electronic key and the list of valid current passwords are periodically changed.

\* \* \* \* \*